(12) United States Patent
Chen et al.

(10) Patent No.: US 8,503,652 B2
(45) Date of Patent: Aug. 6, 2013

(54) TELEPHONE CONFERENCE CALL MANAGEMENT

(75) Inventors: Li Chen, Cary, NC (US); Yongcheng Li, Cary, NC (US); Lun Xiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1417 days.

(21) Appl. No.: 11/735,255

(22) Filed: Apr. 13, 2007

(65) Prior Publication Data

US 2008/0253546 A1  Oct. 16, 2008

(51) Int. Cl.
H04M 3/42 (2006.01)
H04M 1/00 (2006.01)
H04L 12/16 (2006.01)
H04Q 11/00 (2006.01)

(52) U.S. Cl.
USPC ...... 379/202.01; 379/158; 370/260; 370/261; 455/416

(58) Field of Classification Search
USPC ..... 379/202.01, 205.01, 158, 201.1; 370/260, 370/261, 262; 455/414.1, 416
See application file for complete search history.

(56) References Cited

U.S. PATENT DOCUMENTS

| | | | |
|---|---|---|---|
| 4,455,455 A | 6/1984 | Little | |
| 5,812,653 A * | 9/1998 | Jodoin et al. | 379/205.01 |
| 6,798,753 B1 * | 9/2004 | Doganata et al. | 370/260 |
| 6,801,610 B1 | 10/2004 | Malik | |
| 7,149,298 B2 | 12/2006 | Fernandes et al. | |
| 2001/0054071 A1 | 12/2001 | Loeb | |
| 2003/0053423 A1 | 3/2003 | Mateu | |
| 2004/0010548 A1 | 1/2004 | Hamilton, II et al. | |
| 2004/0025026 A1 * | 2/2004 | Karp et al. | 713/183 |
| 2004/0028200 A1 | 2/2004 | Carlson | |
| 2004/0101119 A1 * | 5/2004 | Malcolm et al. | 379/202.01 |
| 2005/0044384 A1 | 2/2005 | Kimura | |
| 2005/0227680 A1 | 10/2005 | Snowden | |
| 2006/0210044 A1 | 9/2006 | Widger | |
| 2006/0291637 A1 * | 12/2006 | Erickson | 379/202.01 |
| 2007/0263825 A1 * | 11/2007 | Shah et al. | 379/202.01 |

OTHER PUBLICATIONS

Swick, Ralph. User Instructions for the W3C Zakim Teleconference Bridge. W3C. Zakim Monitor. Oct. 29, 2003. pp. 1-2. <http://www.w3.org/2002/01/UsingZakim>.
Swick, Ralph. The Zakim IRC Teleconference Agent. W3C. Apr. 11, 2007. pp. 1-21. <http://www.w3.org/2001/12/zakim-irc-bot.html>.

* cited by examiner

Primary Examiner — Khai N Nguyen
(74) Attorney, Agent, or Firm — Marcia L. Doubet

(57) ABSTRACT

Conference calls are managed using a permanent or default password associated with a particular call-in phone number and at least one temporary, dynamically-generated password for that same call-in phone number. The temporary passwords are preferably applicable for a particular time period or interval. If a temporary password is not defined for the time period in which a conference call takes place, the default password may be used. Conference call access is restricted to participants who provide the proper password—namely, the temporary password during a time period for which a temporary password has been generated, and the default password otherwise.

15 Claims, 7 Drawing Sheets

FIG. 1

| Save and Send Invitations | Save as Draft | Find Room or Resource | Delivery Options | Request Password |

Calendar Entry
Meeting ▼

☑ Notify Me  ☐ Default call-in
☐ Mark Private  ☐ Pencil In

Subject: One on One with David

When:
Starts: Tue 01/23/07  09:30 AM
Ends: Tue 01/23/07  10:30 AM  1 hour
☐ Specify a different time zone
☐ Repeats Chair: John Doe/Raleigh/IBM Where:
Location: 1-800-234-5678, 349056
Rooms:
Resources:
Online: ☐ This is an Online Meeting Invitees:
Required (to):
Optional (cc):
FYI (bcc):

Categorize: ▶

Scheduler   Click to see Invitee, Room and Resource availability

Description   Click to append attachement(s)

100, 110, 120, 130, 140, 150

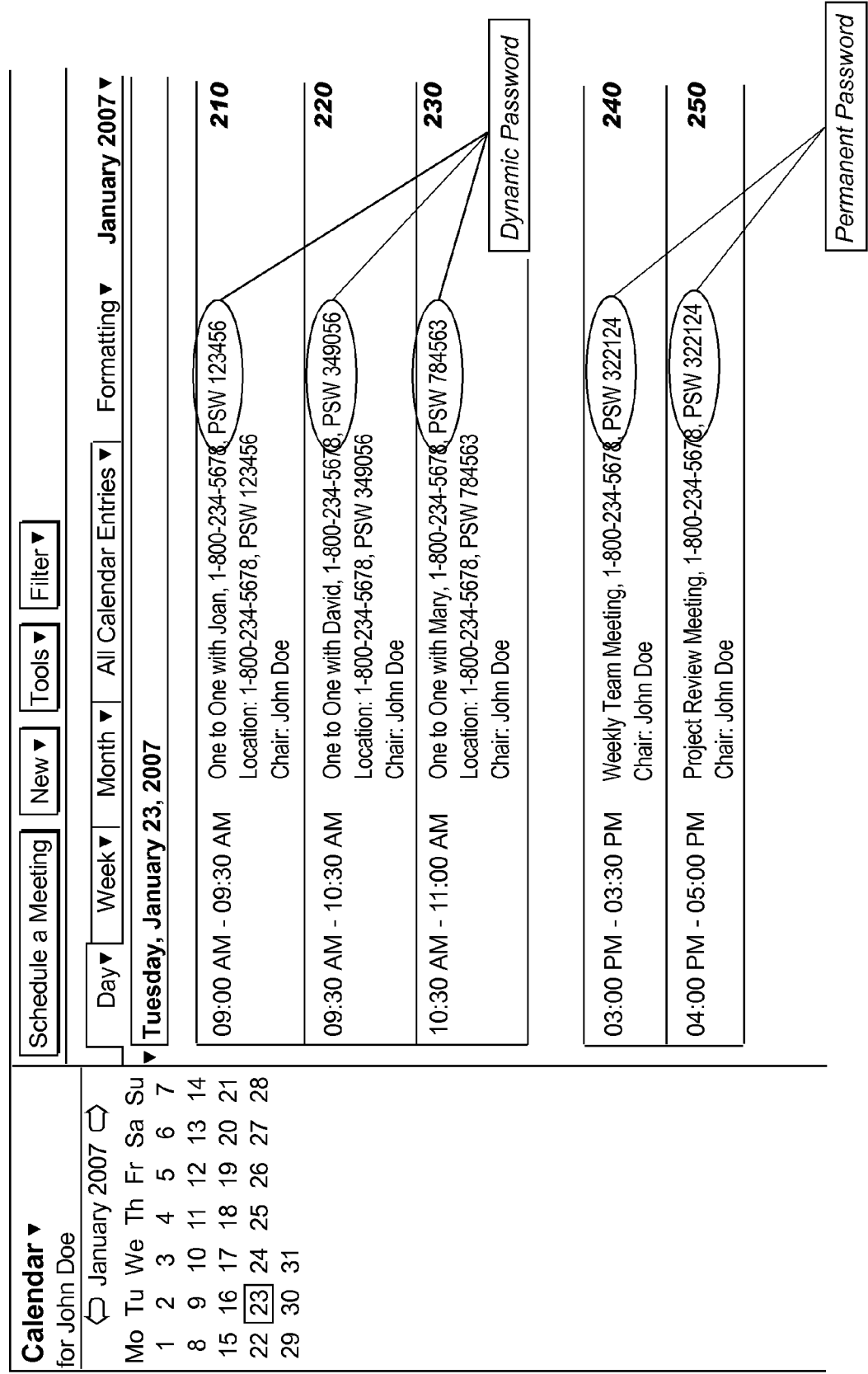

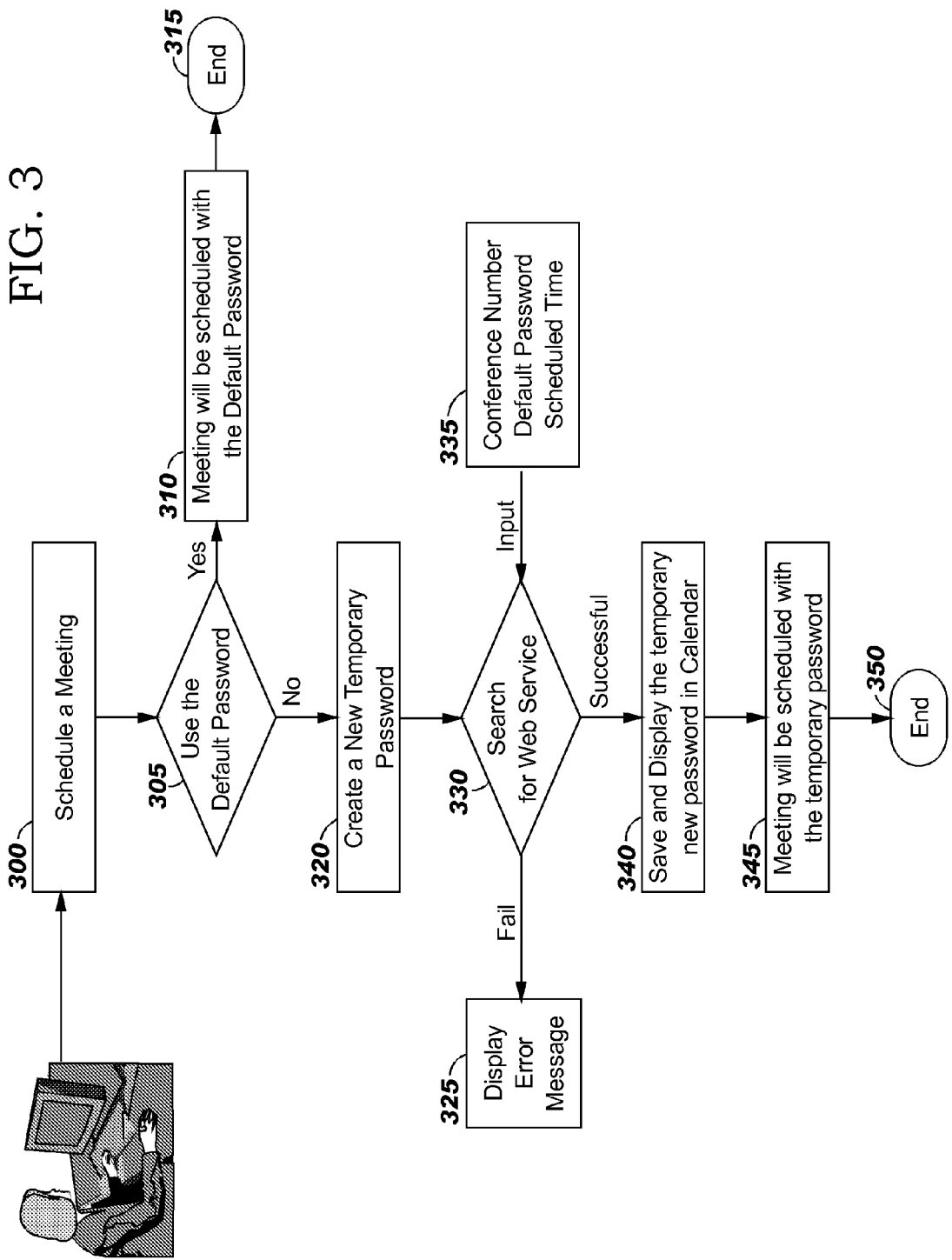

TELEPHONE CONFERENCE CALL MANAGEMENT

BACKGROUND OF THE INVENTION

The present invention relates to telephone conference calls, and deals more particularly with managing access to telephone conference calls.

Telephone conference calls are used extensively in many people's daily work. Many people have their own personally-assigned call-in phone number and corresponding password for hosting conference calls, and use this number and password in all of the conference calls they host. Some people, such as managers of employees or project managers, may host many meetings by conference call, with one meeting scheduled to start right after another meeting ends.

BRIEF SUMMARY OF THE INVENTION

The present invention defines techniques for managing conference calls. In one embodiment, this comprises: associating, with a particular call-in conference call number, a default password and at least one temporary password, wherein each temporary password corresponds to a different time period; and restricting access to a conference call that uses the particular call-in conference call number. Restricting the access preferably further comprises: comparing each participant-provided password to the temporary password corresponding to a particular time period in which the participant calls in using the particular call-in conference call number, if one of the at least one temporary passwords associated with the particular call-in conference call number corresponds to the particular time period, and comparing the participant-provided password to the default password associated with the particular call-in conference call number otherwise; and granting each participant access to the conference call only if the comparing matches that participant's participant-provided password to the compared-to password.

In another aspect, the restricting restricts access to a plurality of conference calls that each use the particular call-in conference call number, and the granting grants each participant access to that one of the conference calls for which the comparing matches the participant-provided password to the compared-to password.

Embodiments of these and other aspects of the present invention may also, or alternatively, be provided as systems or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 provides a sample graphical user interface ("GUI") which may be used to schedule a conference call from within an electronic calendar application;

FIG. 2 depicts a GUI of an electronic calendar application showing information pertaining to conference calls in which the calendar owner is scheduled to participate;

FIGS. 3 and 5 provide flowcharts depicting logic which may be used when implementing an embodiment of the present invention;

DETAILED DESCRIPTION OF THE INVENTION

Figure 4:
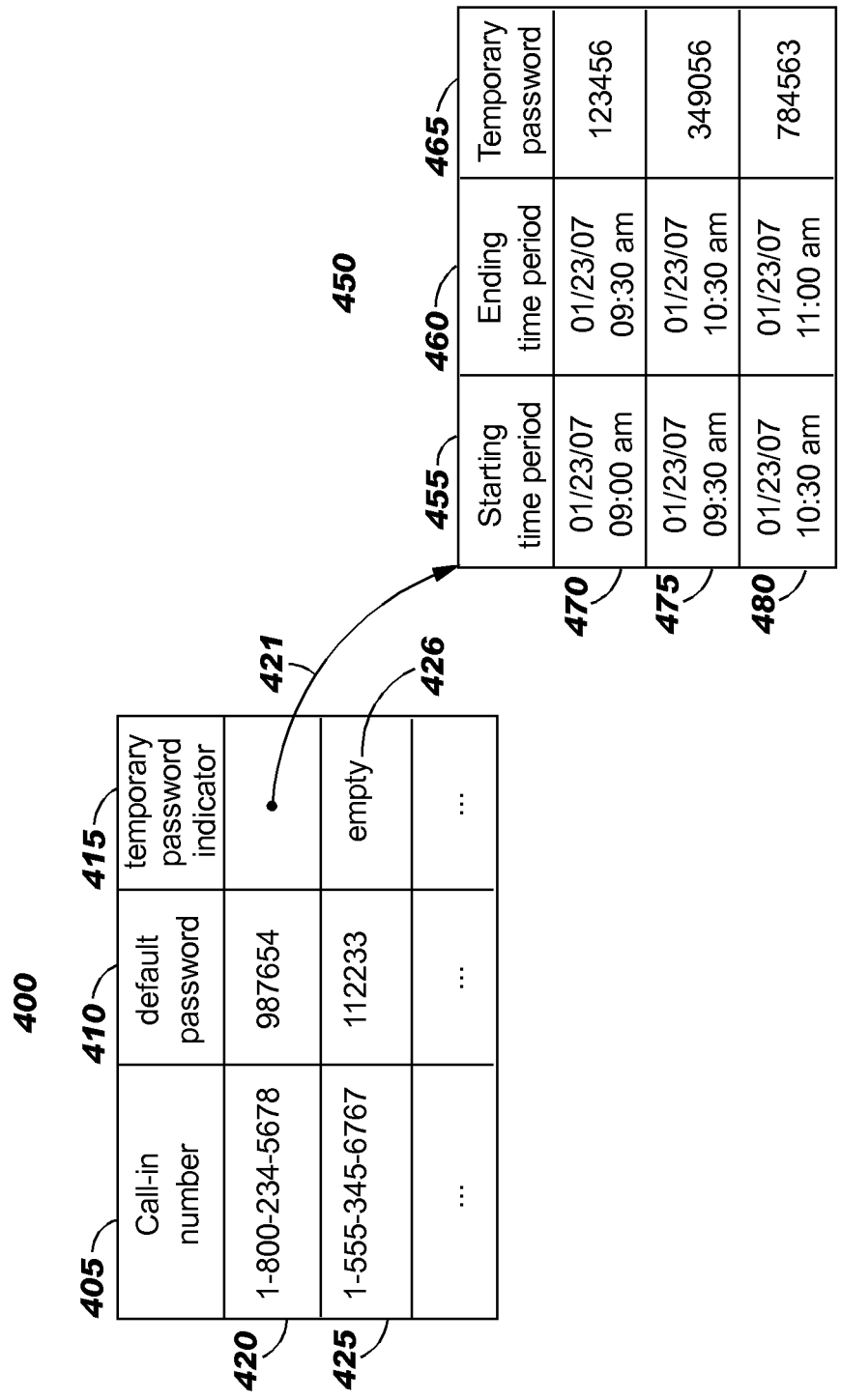
FIG. 4 illustrates sample data structures that may be used for storing information used by an embodiment of the present invention.

The present invention provides enhancements for managing access to telephone conference calls. Typically, a company or person that uses conference calls for telephone meetings enlists the services of a designated conference call provider, which provides the underlying technology for—among other things—providing the physical access to the phone conversation and managing the call-in numbers and passwords. (The term "password", as used herein, may alternatively be referred to as a "passcode".) Usually, a person who will host a conference call contacts the designated conference call provider to schedule a call. As a result, the conference call provider sends back—for each such request—a call-in number and a password associated with that call-in number. Typically, the person scheduling the call then copies and pastes this information into an electronic calendar application which generates the conference call invitation and sends the invitation to all invited participants.

In one existing approach, a single call-in phone number and associated password are assigned to a person who will host one or more conference calls. This person will then reuse the same call-in phone number and associated password if he or she schedules multiple conference calls. No extra setup is then required when the person subsequently has additional conference calls to schedule. Instead, to schedule a conference call among participants using an electronic calendar application, he or she manually fills in the already-assigned call-in number and its associated password in the calendar invitation information. When the invitations are programmatically generated by the calendar application, the call-in number and password are included and then sent out to the identified participants.

As an existing alternative to reusing a call-in number and password, a new call-in number and associated password may be used for each conference call. However, the person scheduling the conference call must repeatedly contact the designated conference call provider to obtain the call-in numbers and the password associated therewith, and must then use each of these separate pairs of information when generating meeting invitations for the participants in the various conference calls. This is inconvenient, as many tedious and manual steps are involved, especially for managers or project managers who hold many meetings by conference call and are usually very busy. In addition, the person hosting a sequence of meetings when using this approach has to separately dial in to each meeting using the call-in number (and password) for that particular meeting, which is time-consuming.

As previously mentioned, many people who host conference calls may schedule one meeting to begin right after another meeting ends. However, problems may arise if a single call-in phone number and its associated password are re-used for each of the meetings. When one conference meeting runs over its scheduled time, people for the next conference call may start to call in. If the same call-in number and password are used, people calling in for the upcoming meeting are able to hear the conversation of the meeting that has not yet ended, which is undesirable. In addition, when the same call-in phone number and password are used repeatedly, someone who remembers this information from a previously-held call may surreptitiously gain access to subsequently-scheduled calls to which he or she has not been invited.

These problems are not limited to conference calls having a number of participants. A similar situation may occur, for example, if managers schedule one-on-one phone meetings with individual ones of their employees using a single call-in number for each such phone meeting. In this situation, personal and confidential information may be discussed between the manager and the employee, and it is undesirable that a second employee dials in while the first employee is still conversing with the manager because the second employee may hear some of the personal and/or confidential information.

An embodiment of the present invention manages conference calls by providing access thereto in a secure manner, whereby security control over telephone conference calls is provided using dynamically-assigned passwords. In an optional aspect, embodiments of the present invention enhance integration between conference call provider systems used by conference call providers and electronic calendar applications used by conference call participants, as will be described.

An embodiment of the present invention dynamically assigns one or more temporary passwords to a single call-in number, even if a permanent password has already been assigned for that call-in number. Using techniques disclosed herein, a conference call provider assigns a permanent password (also referred to herein as a "default" password) for each call-in number when the call-in number is initially allocated in response to a request, and a new temporary password is dynamically generated for each separate conference call that will reuse a call-in number. In one approach, a password generator (which may be deployed, for example, as a network-accessible service) generates a temporary password (also referred to herein as a "dynamic" password) using a call-in number and a time period value.

An embodiment of the present invention stores the generated temporary password, and uses that stored value as the call-in password during the specified time period. If a conference call is held during a time period for which there is no stored temporary password, then the default password associated with (i.e., assigned to) the call-in phone number is used as the call-in password.

In one approach, a calendar application may provide a graphical button (or similar representation) on its user interface, and the person who is using the calendar application to schedule a conference call may then activate this graphical button to invoke the password generator that generates temporary passwords. See reference number 110 in FIG. 1, which illustrates a graphical button usable for this purpose on the sample GUI 100. Reference number 120 depicts, in this sample GUI, how the person scheduling the conference call may indicate the time period during which the call is to be scheduled.

A call-in phone number is illustrated at 140. In one embodiment, this call-in phone number has already been allocated to this meeting scheduler, and the meeting scheduler provides this call-in phone number 140 to the conference call provider along with the time period information (illustrated at 120). The permanent password for this call-in phone number is also preferably supplied to the password generator (not illustrated in FIG. 1), and may be used to authenticate the requester of the dynamic password. As one alternative, a special "moderator password" may be used, whereby the person scheduling the meeting is given a special password that is associated with this call-in phone number and that is distinct from the default password (and which is not to be shared with other meeting participants). This moderator password can then be used to authenticate the meeting scheduler when he or she requests generation of a dynamic password (and may also be used by the meeting scheduler to authenticate the meeting scheduler when he or she calls in to a conference call).

In response to an invocation, the password generator generates a temporary password and returns it to the caller (i.e., to the electronic calendar application, in this scenario). See reference number 150 of FIG. 1, which represents a sample temporary password value of "349056". This temporary password is then programmatically added to the programmatically-generated invitations which are created by the electronic calendar application. (As one alternative to this described integration between the password generator and the electronic calendar application, the password generator may be invoked from outside the electronic calendar application, and the temporary password may then be added manually to the invitations by the person scheduling the meeting.)

See FIG. 2, which illustrates the electronic calendar of a sample person who participates in many conference calls throughout the day. For the particular day illustrated on GUI 200, there are calendar entries for 5 different conference calls which are scheduled for this person. See reference numbers 210-250.

As can be seen by inspection, the calendar entries 210-250 depicted on GUI 200 each indicate a call-in phone number and an associated password. In this example, the call-in phone number "1-800-234-5678" is reused for each call. (See, for example, the value that follows the topic specified in each calendar entry. For example, in calendar entry 210, the topic is "One to One with Joan", and the call-in phone number follows this topic information.) Each of this person's first 3 conference calls are scheduled one right after another, as can be seen by the starting and ending times in calendar entries 210-230. Accordingly, the meeting scheduler has obtained dynamic passwords for use by participants calling in to each meeting, using techniques disclosed herein. See the "PSW" values (i.e., the password values) represented in calendar entries 210-230, which specify values of "123456", "349056", and "784563", respectively. The meeting host will therefore be able to continue using the same phone call for all 3 conference calls while limiting access to those participants who provide the correct dynamic password, thereby preventing callers from inadvertently hearing information from a separately-scheduled meeting that uses that same call-in phone number.

Note that the "PSW" value for calendar entry 220 is "349056". This meeting is scheduled to occur between 9:30 a.m. and 10:30 a.m., and corresponds to the meeting scheduling scenario depicted in FIG. 1. Accordingly, the dynamic password obtained from the password generator (as discussed above with reference to 150 of FIG. 1) is reflected in the corresponding calendar entry when the meeting is scheduled on the electronic calendars of the meeting participants, as shown in calendar entry 220.

Note also that the information of the form illustrated at 210-250 may be provided on the electronic calendar of the person hosting the conference calls, and this form of information is also preferably provided on the electronic calendar of the invited meeting participants. While the meeting host is not required to enter separate dynamic passwords for authenticating himself for each meeting, providing the dynamic passwords on the electronic calendar entries for the meeting host may be useful (for example) in case an invited meeting participant loses the dynamic password for a particular meeting and contacts the meeting host for that information.

In some cases, it may happen that the person scheduling a meeting does not need to protect access to the conference call using a dynamic password. For example, the 2 conference calls represented by calendar entries 240, 250 are separated in time by 30 minutes. The meeting scheduler may therefore choose to use the permanent password for those meetings. See calendar entries 240, 250, where this permanent password is illustrated as having a "PSW" value of "322124". Referring again to FIG. 1, a graphical check-box is illustrated at reference number 130. The meeting scheduler may check this box (or use another indication means such as a "Use Default" graphical button) to indicate that the default password is to be used with the call-in number when scheduling a particular conference call. In that situation, the password generator is not invoked, and the invitations are generated using the default password.

Referring now to FIG. 3, a flowchart is shown depicting logic which may be used when implementing an embodiment of the present invention for scheduling a meeting to be held by conference call (i.e., for scheduling a conference call). This process begins by invoking the meeting scheduler logic in an electronic calendar application (Block 300). Block 305 asks whether the default password will be used for the meeting (e.g., responsive to the meeting scheduler checking box 130 in FIG. 1). If so, then Block 310 schedules the conference call meeting using the default password (e.g., by sending invitations to each invited meeting participant, where those invitations provide the call-in phone number and the default password), and the processing of FIG. 3 ends at 315.

Otherwise, when the test in Block 305 has a negative result, control reaches Block 320 which indicates that a new temporary password will be generated. In one approach, a network-accessible password generator may be located dynamically, as shown at Block 330 which refers to a "web service" and tests to see if a search for such web service is successful. Web services are known in the art, and existing techniques may be used for contacting a network-accessible registry to locate a registered password generator of the type disclosed herein. As one alternative to contacting a network-accessible registry, configuration information of the electronic calendar application may specify a location (such as a uniform resource locator, or "URL") for contacting a password generator that generates temporary passwords and associates them with call-in phone numbers for conference calls, as disclosed herein.

Block 335 indicates that input parameters provided to the password generator comprise, in one embodiment, a call-in conference phone number, a default password that was previously associated with that conference number, and a scheduled time period for the conference call (as has been discussed above with reference to FIG. 1).

If a password generator cannot be located, the test in Block 330 has a negative result, and an error message is preferably displayed to the meeting scheduler (Block 325) on the GUI of the calendar application. If the test in Block 330 has a positive result, on the other hand, then processing continues at Block 340, which saves the temporary password generated by the password generator. Preferably, the temporary password is also displayed on the GUI of the calendar application. Block 345 then schedules the conference call meeting using this temporary password (e.g., by sending invitations to each meeting participant, where those invitations provide the call-in phone number and the temporary password) and the processing of FIG. 3 ends at 350.

FIG. 4 shows one approach which may be used for storing call-in phone numbers and passwords for use with an embodiment of the present invention. A tabular data structure 400 is shown, by way of illustration but not of limitation. In this example, the data structure 400 has 3 columns, namely a call-in phone number column 405, a default password column 410, and a temporary password indicator column 415. (When using a moderator password as has been previously discussed, an additional column is preferably provided for storing this moderator password.) Data structure 400 may have a plurality of rows, and the example illustrates 2 rows 420, 425. Each row stores a particular call-in phone number, the default password associated with that call-in phone number, and an indication of whether or not any temporary passwords are associated with this call-in phone number. For this example, row 420 indicates (using an arrow 421) a link to an associated data structure 450 where temporary password information for call-in phone number "1-800-234-5678" is stored, whereas column 415 is depicted as empty (see 426) for row 425 to indicate that there is no temporary password information associated with call-in phone number "1-555-345-6767".

Referring now to data structure 450, a tabular structure is shown in this example (by way of illustration but not of limitation), and comprises 3 columns. In particular, sample data structure 450 comprises a starting time period column 455, an ending time period column 460, and a temporary password column 465. Data structure 450 may have a plurality of rows, and the example illustrates 3 rows 470, 475, 480. Each row stores a starting time period, an ending time period, and a temporary password to be used in that time period or interval (i.e., between the starting time period and the ending time period). In this sample data structure 450, rows 470-480 correspond to calendar entries 210-230 of FIG. 2. For example, row 475 indicates that the temporary password to be used between 9:30 a.m. and 10:30 a.m. on a particular day, when calling in to phone number "1-800-234-5678", is "349056" (as discussed above with reference to 150 of FIGS. 1 and 220 of FIG. 2).

So, for example, a participant who has been given the temporary password "123456" for call-in phone number "1-800-234-5678" can call in, and be granted access, during the time interval from 9:00 a.m. to 9:30 a.m. on the scheduled day. See row 470 of table 450 in FIG. 4. If that same person calls in using that phone number after 9:30 a.m., however, providing the temporary password "123456" will result in the person being denied access to the call. Similarly, if a participant who has been given the temporary password "349056" calls in prior to the scheduled 9:30 a.m. starting time, or after the 10:30 a.m. ending time, this temporary password will not work and the person will be denied access.

Data structure 450 may be implemented, for example, using a linked list or array data structure. In one approach, a separate data structure 450 is linked to, or otherwise associated with, each row from data structure 400 for which temporary passwords are stored. In another approach, column 415 may provide a pointer into a single data structure 450 that is shared among the rows of data structure 400. Entries in data structure 450 may be purged, if desired, when the time interval represented by that row has elapsed.

Figure 5:
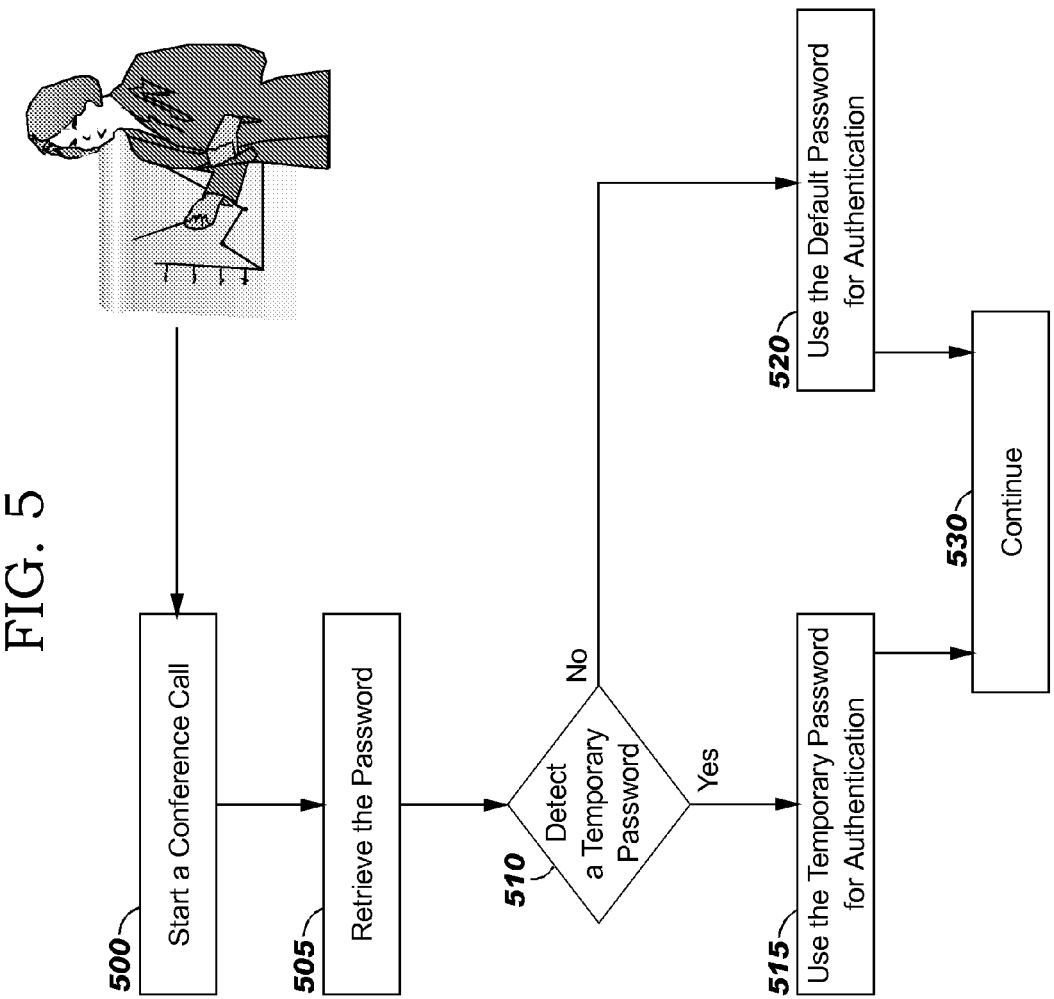

FIG. 5 provides a flowchart depicting logic which may be used when implementing an embodiment of the present invention for managing participation in a conference call. The conference call starts (Block 500) and the password to be used in the conference call is retrieved (Block 505). Preferably, this comprises using the call-in phone number as an index to access a data structure such as data structure 400 of FIG. 4. If the temporary password column 415 is empty for this call-in number, then Block 505 preferably retrieves the default password stored in column 410. Otherwise, when the temporary password column 415 is not empty, Block 505 preferably accesses a data structure such as data structure 450 (e.g., by following a link provided in column 415) to determine whether an entry is stored therein that matches the current time period (i.e., the current date and current time of day). If a matching entry is found, then the temporary password stored in column 465 of that entry is retrieved in Block 505. If there is no matching time period entry in data structure 465, then Block 505 preferably retrieves the default password stored in column 410 for the call-in phone number.

Optionally, a configuration parameter may be used in the matching process that searches through data structure 465, whereby a particular amount of time is applied as a tolerance value for determining whether a matching time period entry is located. For example, if the current time of day is 8:55 a.m. but the earliest starting time period represented in data structure 450 is 9:00 a.m., then it may be presumed that the caller is calling in early for the upcoming scheduled conference call. The configuration parameter may indicate, for example, that calls up to 8 minutes early are to be considered as matching the upcoming time period. In this case, Block 505 returns the temporary password stored in column 465 of the entry from data structure 450 which matches when considering the tolerance value.

Block 510 tests whether a temporary password was detected. If so, then this temporary password will be used for authenticating callers, as indicated in Block 515; otherwise, the default password will be used for authentication, as indicated by Block 520. In either case, the conference call then proceeds using the indicated authentication approach (Block 530).

From the perspective of the participants in the conference call, upon calling in to the call-in number provided in the conference call invitation, each participant provides the password from his or her conference call invitation. The participant does not need to know whether this is the default password or a temporary password. The conference call provider system then uses the participant-provided password to authenticate the participant for access to the conference call. As described with reference to FIG. 5, this preferably comprises (1) comparing the participant-provided password to the temporary password associated with the current time period, or (2) comparing the participant-provided password to the default password for the call-in phone number otherwise (that is, when no temporary passwords are associated with this call-in number and also when no temporary password applies to the current time period). If the participant-provided password matches during the comparison, then this participant is granted access to the conference call; otherwise, the participant is denied access.

Data structures 400 and 450 may be stored by a conference call provider, with entries stored therein for a plurality of call-in numbers which are managed by that conference call provider (and each of these call-in numbers may be allocated to a different conference call host). In this case, the conference call provider may carry out the participation management depicted in FIG. 5 by checking data structure 400 (and data structure 450, when applicable) for stored password information for each incoming participation request. Data structures of this form may also, or alternatively, be stored by an electronic calendar application to record the information needed for generating meeting invitations.

While embodiments of the present invention have been described with reference to scheduling conference calls from an electronic calendar application, this is by way of illustration and not of limitation. As alternatives, conference calls may be scheduled using other types of collaboration software or other types of groupware.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 6:
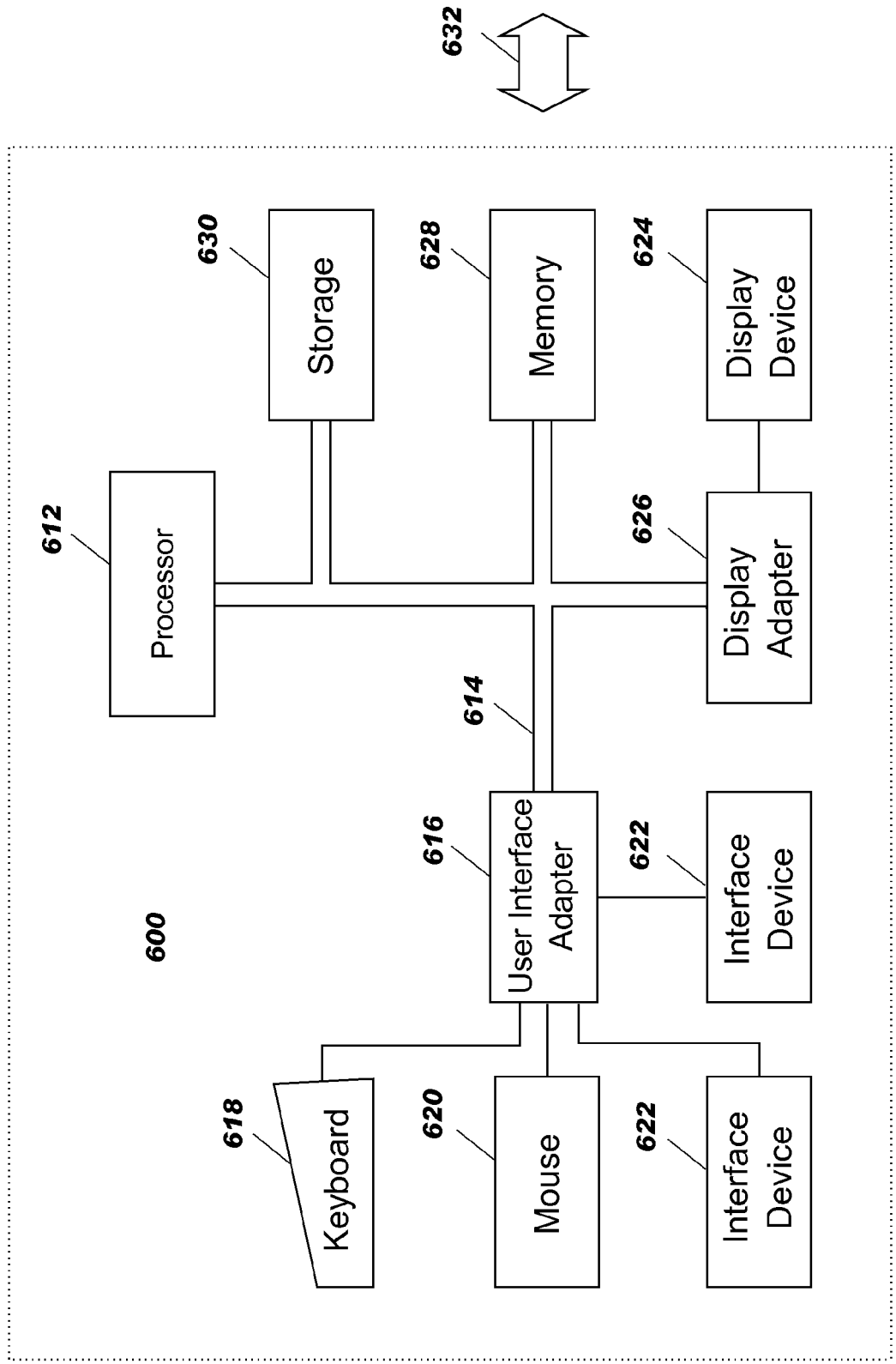
FIG. 6 depicts a data processing system suitable for storing and/or executing program code.

Referring now to FIG. 6, a data processing system 600 suitable for storing and/or executing program code includes at least one processor 612 coupled directly or indirectly to memory elements through a system bus 614. The memory elements can include local memory 628 employed during actual execution of the program code, bulk storage 630, and cache memories (not shown) which provide temporary storage of at least some program code in order to reduce the number of times code must be retrieved from bulk storage during execution.

Input/output ("I/O") devices (including but not limited to keyboards 618, displays 624, pointing devices 620, other interface devices 622, etc.) can be coupled to the system either directly or through intervening I/O controllers or adapters (616, 626).

Network adapters may also be coupled to the system to enable the data processing system to become coupled to other data processing systems or remote printers or storage devices through intervening private or public networks (as shown generally at 632). Modems, cable modem attachments, wireless adapters, and Ethernet cards are just a few of the currently-available types of network adapters.

Figure 7:
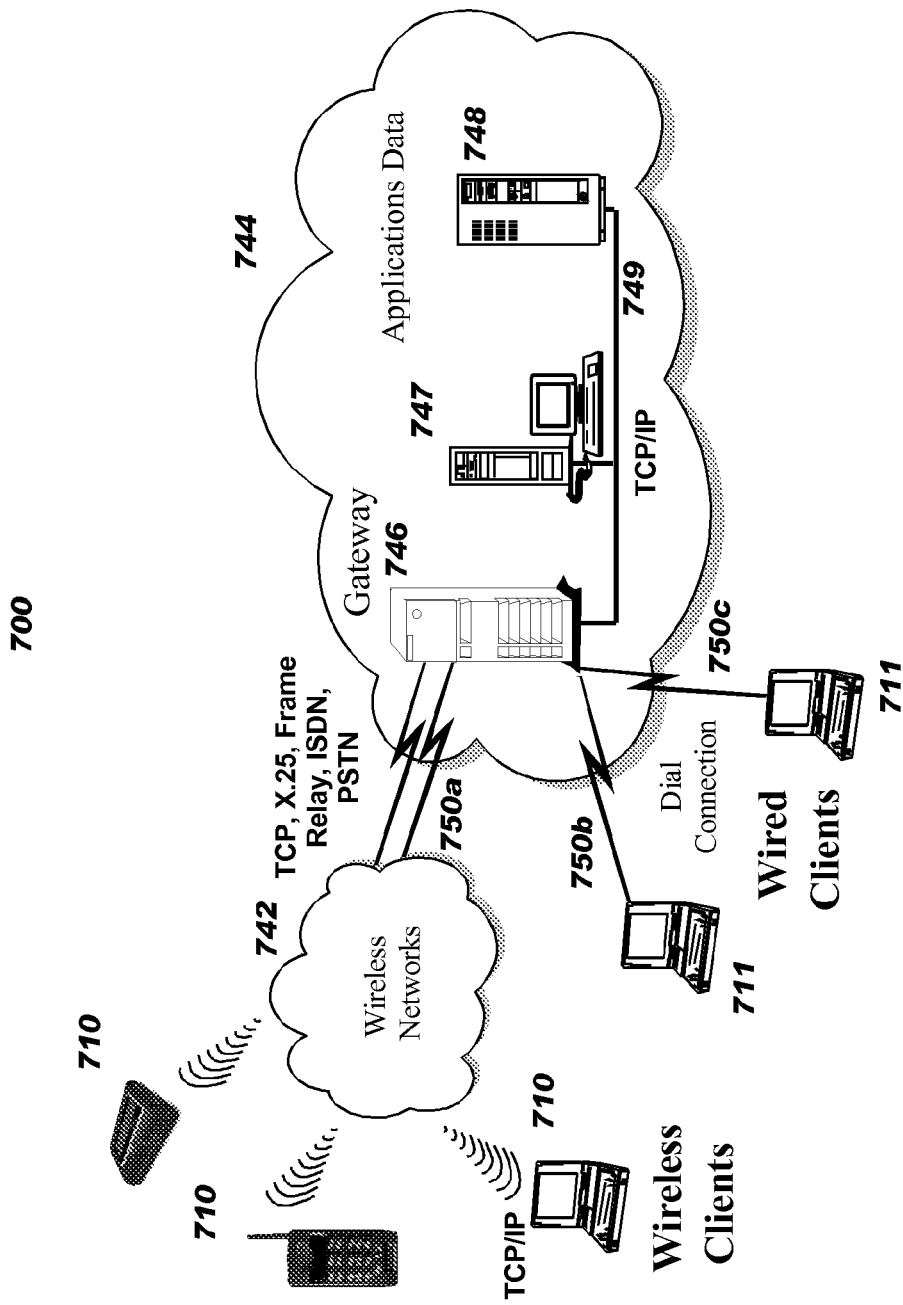
FIG. 7 depicts a representative networking environment in which one or more embodiments of the present invention may be used.

FIG. 7 illustrates a data processing network environment 700 in which the present invention may be practiced. The data processing network 700 may include a plurality of individual networks, such as wireless network 742 and network 744. A plurality of wireless devices 710 may communicate over wireless network 742, and a plurality of wired devices, shown in the figure (by way of illustration) as workstations 711, may communicate over network 744. Additionally, as those skilled in the art will appreciate, one or more local area networks ("LANs") may be included (not shown), where a LAN may comprise a plurality of devices coupled to a host processor.

Still referring to FIG. 7, the networks 742 and 744 may also include mainframe computers or servers, such as a gateway computer 746 or application server 747 (which may access a data repository 748). A gateway computer 746 serves as a point of entry into each network, such as network 744. The gateway 746 may be preferably coupled to another network 742 by means of a communications link 750a. The gateway 746 may also be directly coupled to one or more workstations 711 using a communications link 750b, 750c, and/or may be indirectly coupled to such devices. The gateway computer 746 may be implemented utilizing an Enterprise Systems Architecture/390® computer available from IBM. Depending on the application, a midrange computer, such as an Application System/400® (also known as an AS/400®) may be employed. ("Enterprise Systems Architecture/390", "Application System/400", and "AS/400" are registered trademarks of IBM in the United States, other countries, or both.)

The gateway computer 746 may also be coupled 749 to a storage device (such as data repository 748).

Those skilled in the art will appreciate that the gateway computer 746 may be located a great geographic distance from the network 742, and similarly, the wireless devices 710 and/or workstations 711 may be located some distance from the networks 742 and 744, respectively. For example, the network 742 may be located in California, while the gateway 746 may be located in Texas, and one or more of the workstations 711 may be located in Florida. The wireless devices 710 may connect to the wireless network 742 using a networking protocol such as the Transmission Control Protocol/Internet Protocol ("TCP/IP") over a number of alternative connection media, such as cellular phone, radio frequency networks, satellite networks, etc. The wireless network 742 preferably connects to the gateway 746 using a network connection 750a such as TCP or User Datagram Protocol ("UDP") over IP, X.25, Frame Relay, Integrated Services Digital Network ("ISDN"), Public Switched Telephone Network ("PSTN"), etc. The workstations 711 may connect directly to the gateway 746 using dial connections 750b or 750c. Further, the wireless network 742 and network 744 may connect to one or more other networks (not shown), in an analogous manner to that depicted in FIG. 7.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer implemented method of managing conference calls, comprising using a processor of a computer for:
  associating, with a particular call-in conference call number, at least two temporary passwords, wherein each temporary password corresponds to a different time period in which the particular call-in conference call number is reused for a plurality of conference calls, each temporary password generated responsive to a temporary password generation request invoked by a call scheduler who provides a scheduler-provided password for authentication, the scheduler-provided password being distinct from the temporary passwords; and
  managing conference calls of a meeting host at the particular call-in conference call number, comprising:
    obtaining, from a participant who is distinct from the meeting host and who calls the particular call-in conference call number on a particular day at a particular time of day, a participant-provided password;
    comparing the participant-provided password to the previously-generated temporary password corresponding to a time period that includes the particular day and the particular time of day, wherein the comparing factors a tolerance value into the time period that includes the particular day and the particular time of day; and
    granting the participant access to a conference call scheduled on the particular call-in conference call number for the time period that includes the particular day and the particular time of day only if the comparing matches the participant's participant-provided password to the compared-to temporary password.

2. The method according to claim 1, wherein the temporary password generation request invoked to generate each temporary password programmatically supplies the particular call-in conference call number and the corresponding time period to a password generator.

3. The method according to claim 2, wherein the password generator comprises a network-accessible service.

4. The method according to claim 1, further comprising performing, prior to the managing:
  programmatically retrieving the temporary password that corresponds to the time period of a selected one of the plurality of conference calls for which the particular call-in conference call number is reused; and
  programmatically generating a conference call invitation, for each of at least one invited participant of the selected conference call, wherein the generated conference call invitation specifies the programmatically-retrieved temporary password.

5. The method according to claim 4, further comprising: sending each generated conference call invitation to the invited participant for whom the invitation was generated.

6. The method according to claim 5, wherein the programmatically retrieving, the programmatically generating, and the sending are performed by an electronic calendar application from which the temporary password generation request was invoked.

7. The method according to claim 1, wherein each of the different time periods is non-overlapping with other ones of the different time periods.

8. The method according to claim 1, wherein the temporary password generation request is invoked from a user interface of an electronic calendar application that is used to schedule the plurality of conference calls for which the particular call-in conference call number is reused.

9. A system for managing conference calls, comprising:
a computer comprising a processor; and
instructions which are executable, using the processor, to implement functions comprising:
associating, with a particular call-in conference call number, at least two temporary passwords, wherein each temporary password corresponds to a different time period in which the particular call-in conference call number is reused for a plurality of conference calls, each temporary password generated responsive to a temporary password generation request invoked by a call scheduler who provides a scheduler-provided password for authentication, the scheduler-provided password being distinct from the temporary passwords; and
managing a particular conference call which is initiated, for a particular day at a particular time, by a meeting host calling the particular call-in conference call number, comprising:
obtaining, from the meeting host as a participant-provided password for the particular conference call, the scheduler-provided password;
initiating the particular conference call by granting the meeting host access to a conference call scheduled on the particular call-in conference call number for a time period that includes the particular day if the scheduler-provided password matches a password that is permanently associated with the particular call-in conference number and which is distinct from the temporary passwords, without regard to the particular day or the particular time;
obtaining, from a participant who is distinct from the meeting host and who calls the particular call-in conference call number on the particular day at the particular time of day, a participant-provided password;
comparing the participant-provided password to the previously-generated temporary password corresponding to the time period that includes the particular day and the particular time of day; and
granting the participant access to the conference call scheduled on the particular call-in conference call number for the time period that includes the particular day and the particular time of day only if the comparing matches the participant's participant-provided password to the compared-to temporary password.

10. The system according to claim 9, wherein the temporary password generation request invoked to generate each temporary password programmatically supplies the particular call-in conference call number, the corresponding time period, and the scheduler-provided password to a password generator, wherein the scheduler-provided password serves to authenticate the call scheduler to the password generator.

11. The system according to claim 10, wherein the password generator comprises a network-accessible service.

12. The system according to claim 9, wherein the functions further comprise:
programmatically retrieving the temporary password that corresponds to the time period of a selected one of the plurality of conference calls for which the particular call-in conference call number is reused;
programmatically generating a conference call invitation, for each of at least one invited participant of the selected one of the conference calls, wherein the generated conference call invitation specifies the programmatically-retrieved temporary password; and
sending each generated conference call invitation to the invited participant for whom the invitation was generated.

13. A computer program product for managing conference calls, the computer program product embodied on at least one non-transitory computer-usable storage media and comprising computer-readable program code which, when executed by a computer, causes the computer to perform:
associating, with a particular call-in conference call number, at least two temporary passwords and a default password, wherein each temporary password corresponds to a different time period in which the particular call-in conference call number is reused for a plurality of conference calls, each temporary password generated responsive to a temporary password generation request invoked by a call scheduler who provides a scheduler-provided password for authentication, wherein the scheduler-provided password is distinct from the temporary passwords and the default password is distinct from the temporary passwords and the scheduler-provided password; and
managing conference calls of a meeting host at the particular call-in conference call number, comprising:
obtaining, from a participant who is distinct from the meeting host and who calls the particular call-in conference call number on a particular day at a particular time of day, a participant-provided password;
responsive to determining that a selected one of the previously-generated temporary passwords corresponds to a time period that includes the particular day and the particular time of day on which the participant calls the particular call-in conference call number, granting the participant access to a conference call scheduled on the particular call-in conference call number for the time period only if the participant's participant-provided password matches the selected temporary password; and
responsive to determining that none of the previously-generated temporary passwords corresponds to the time period, granting the participant access to the conference call scheduled on the particular call-in conference call number for the time period if the participant's participant-provided password matches the default password.

14. The computer program product according to claim 13, wherein the temporary password generation request invoked to generate each temporary password programmatically supplies the particular call-in conference call number, the corresponding time period, and the scheduler-provided password to a password generator, wherein the scheduler-provided password serves to authenticate the call scheduler to the password generator.

15. The computer program product according to 13, wherein the computer-readable program code further causes the computer to perform:
   programmatically retrieving the temporary password that corresponds to the time period of a selected one of the plurality of conference calls for which the particular call-in conference call number is reused;
   programmatically generating a conference call invitation, for each of at least one invited participant of the selected one of the conference calls, wherein the generated conference call invitation specifies the programmatically-retrieved temporary password; and
   sending each generated conference call invitation to the invited participant for whom the invitation was generated.

* * * * *